United States Patent
Bussi et al.

(10) Patent No.: US 6,962,754 B2
(45) Date of Patent: Nov. 8, 2005

(54) STRUCTURE COMPRISING A FLUOROPOLYMER LAYER AND A PIPERAZINE-BASED TIE RESIN

(75) Inventors: Philippe Bussi, Bernay (FR); Christophe Lacroix, Harquency (FR); David Silagy, Evreux (FR)

(73) Assignee: ARKEMA, Paris la Defense Cedex (FR)

( * ) Notice: Subject to any disclaimer, the term of this patent is extended or adjusted under 35 U.S.C. 154(b) by 380 days.

(21) Appl. No.: 10/174,507

(22) Filed: Jun. 19, 2002

(65) Prior Publication Data

US 2003/0035971 A1 Feb. 20, 2003

(30) Foreign Application Priority Data

Jun. 19, 2001 (FR) .............................. 01 08028

(51) Int. Cl.⁷ .............................. B32B 27/08
(52) U.S. Cl. ................. 428/474.4; 428/411.1; 428/475.8; 428/476.3; 156/60; 156/325; 156/326; 156/327; 156/330.9; 156/331.1; 264/171.27; 264/173.12; 264/173.16; 264/176.1; 264/297.4
(58) Field of Search ............... 428/411.1, 474.4, 428/475.8, 476.3, 421–422; 264/171.27, 173.12, 173.16, 176.1, 297.4; 156/60, 325–327, 330.9, 331.1

(56) References Cited

U.S. PATENT DOCUMENTS

| | | | |
|---|---|---|---|
| 4,327,248 A | | 4/1982 | Campbell |
| 6,143,415 A | * | 11/2000 | Lorek et al. ................. 428/421 |
| 6,197,393 B1 | * | 3/2001 | Jing et al. ................... 428/35.9 |
| 6,432,542 B1 | * | 8/2002 | Tsai ............................ 428/421 |
| 6,524,671 B1 | * | 2/2003 | Spohn ........................ 428/35.7 |
| 6,667,101 B2 | * | 12/2003 | Silagy et al. ............ 428/411.1 |
| 6,776,195 B2 | * | 8/2004 | Blasko et al. ................ 138/141 |

FOREIGN PATENT DOCUMENTS

| | | | |
|---|---|---|---|
| EP | 0450994 | | 10/1991 |
| GB | 2173809 A | * | 10/1986 |
| JP | 03-104637 | * | 5/1991 |
| JP | 07-018035 | * | 1/1995 |
| JP | 09-118763 | * | 5/1997 |
| JP | 11-151781 | * | 6/1999 |
| WO | 9605964 | | 2/1996 |

OTHER PUBLICATIONS

XP002193451—Patent Abstract of Japan, JP 59030243 A (Hitachi COndenser KK), 17 fevrier 1996 (Feb. 29, 1996).

* cited by examiner

*Primary Examiner*—P. Hampton Hightower
(74) *Attorney, Agent, or Firm*—Millen, White, Zelano, Branigan, P.C.

(57) ABSTRACT

A structure made of a fluoropolymer layer and directly attached to one of its sides a tie layer based on a polyamide which results from the condensation of at least one diacid and at least one diamine of the following formula (1):

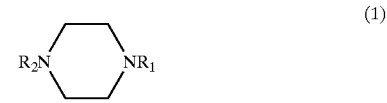

(1)

in which $R_1$ represents H or $-Z1-NH_2$ and Z1 represents an alkyl, a cycloalkyl or an aryl having up to 15 carbon atoms and $R_2$ represents H or $-Z2-NH_2$ and Z2 represents an alkyl, a cycloalkyl or an aryl having up to 15 carbon atoms, it being possible for $R_1$ and $R_2$ to be identical or different. The tie resin may also be a copolymer having polyamide blocks and polyether blocks, the polyamide blocks resulting from condensation of at least one diacid and at least one diamine of formula (1). The invention also relates to a structure comprising a fluoropolymer layer, the tie layer and a substrate layer, respectively, as well as to a structure comprising a tie layer, respectively. This structure may be placed between two substrate layers and may be in the form of a sheet, film, profile or tube. It is particularly useful in the form of a tube for transporting gasoline between the tank and the injection device in motor-vehicle engines.

36 Claims, No Drawings

STRUCTURE COMPRISING A FLUOROPOLYMER LAYER AND A PIPERAZINE-BASED TIE RESIN

FIELD OF THE INVENTION

The present invention relates to a structure comprising a fluoropolymer layer and a tie resin which is a piperazine-based polymer.

Fluoropolymers are characterized by good thermal resistance, good chemical resistance, especially resistance to solvents, and good UV radiation resistance, for example. They are also endowed with properties of being impermeable to gases and liquids and have electrical insulation properties. However, their adhesion to a large number of substrates is very poor or even non-existent. The structure of the invention may be hot-bonded by pressing it on the tie-resin side against the substrate. The substrate may be a metal, wood, glass or a polymer. The invention also relates to a structure comprising a fluoropolymer layer, a piperazine-based tie layer and a substrate layer, respectively. The fluoropolymer and substrate layers may be sheets or films.

Thus, the structure of the invention may be a three-layer film. The structure of the invention may also be obtained by lamination.

PRIOR ART AND TECHNICAL PROBLEM

Patent EP 450994 describes a tie resin consisting of a blend of PVDF, PMMA and a core-shell copolymer with an acrylic shell. This tie resin is used to make a PVDF film adhere to an ABS substrate.

Patent WO 96/05964 describes the bonding of PVDF films to polyolefins or polyamides. According to that patent, a polyamine such as, for example, hexamethylenediamine, in solution in an alcohol is deposited on one side of the PVDF film and the PVDF film coated with the diamine is hot-pressed onto the polyolefin or polyamide film, the diamine-coated side facing the polyolefin or polyamide film.

Patent EP 0 918 071 describes a polyamide containing amine-terminated piperazine units as a crosslinking agent for epoxy resins. This makes it possible to increase the corrosion resistance and the adhesion to a wet substrate.

Patent EP 378205 describes a polyamide obtained by the condensation of a fatty acid, a diamine and an alkylpiperazine. This polyamide is used to bond PVC to metals.

Patent GB 2 173 809 is similar to the previous one—it describes a polyamide obtained by the condensation of a fatty acid, a diamine, piperazine and a polyetherdiamine. This polyamide is used to bond polyvinylidene chloride to itself or to PVC.

Patents U.S. Pat. No. 4 611 051 and FR 2 386 573 are similar to the previous two patents.

The above four patents describing piperazine-based polyamide tie resins neither describe nor suggest the use of these tie resins for PVDF.

The tie resin described in EP 450994 is a blend of three polymers and it is necessary to prepare it by melt-blending the three polymers. In addition, in order to coextrude it with PVDF and ABS, it is necessary to remelt it, or to use it after it has been prepared, at a temperature which is at least equal to the melting point of PVDF (195° C.). If this temperature is not reached, the adhesion of the PVDF and ABS is not good.

It has now been found that polyamides resulting from the condensation of piperazine (or an aminoalkylpiperazine) with a diacid are good tie resins for bonding between the PVDF and a substrate. In addition, these tie resins are easy to manufacture and are used over a wide temperature range guaranteeing good adhesion of the PVDF to the substrate.

BRIEF DESCRIPTION OF THE INVENTION

The present invention relates to a structure comprising a fluoropolymer layer and directly attached to one of its sides a tie layer based on a polyamide which results from the condensation of at least one diacid and at least one diamine of the following formula (1):

in which:
$R_1$ represents H or -Z1-$NH_2$ and Z1 represents an alkyl, a cycloalkyl or an aryl having up to 15 carbon atoms and
$R_2$ represents H or -Z2-$NH_2$ and Z2 represents an alkyl, a cycloalkyl or an aryl having up to 15 carbon atoms,
it being possible for $R_1$ and $R_2$ to be identical or different.

The tie resin may include other units chosen from alpha, omega-aminocarboxylic acids and diamines different from the diamine of formula (1).

The tie resin may also be a copolymer having polyamide blocks and polyether blocks, the polyamide blocks resulting from condensation of at least one diacid and at least one diamine of formula (1). The polyamide blocks may include, as above, other units chosen from alpha, omega-aminocarboxylic acids and diamines different from the diamine of formula (1).

The structure comprising a fluoropolymer layer and, directly attached to one of its sides, the tie layer may be produced by coextruding or laminating the tie layer onto the fluoropolymer layer. It may also be hot-bonded by pressing it on the tie-resin side to a substrate. It may also be produced by coextruding the fluoropolymer layer and the tie layer and simultaneously bonded to the substrate.

The invention also relates to a structure comprising a fluoropolymer layer, the tie layer and a substrate layer, respectively. The fluoropolymer and substrate layers may, for example, be sheets, films, profiles or tubes. Thus, the structure of the invention may be a three-layer film or tube. This structure may also be produced directly by coextruding the three layers. It is also possible to coextrude the tie layer and the substrate layer or to laminate the tie layer to the substrate and then, simultaneously or subsequently, hot-bond this substrate/tie resin two-layer structure on the tie-resin side to the fluoropolymer.

The invention also relates to a structure comprising a tie layer, a fluoropolymer layer and another tie layer, respectively. This structure may be produced by coextruding or laminating the tie resin to each side of a fluoropolymer layer or else by coextruding a fluoropolymer layer and a tie layer and then laminating another tie layer to the fluoropolymer/tie resin two-layer structure on the fluoropolymer side. This structure may be placed between two substrate layers and may be in the form of a sheet, film, profile or tube. It is particularly useful in the form of a tube for transporting petrol between the tank and the injection device in motor-vehicle engines.

DETAILED DESCRIPTION OF THE INVENTION

With regard to the fluoropolymer, this is understood to mean any polymer having in its chain at least one monomer chosen from compounds containing a vinyl group capable of opening in order to be polymerized and which contains, directly attached to this vinyl group, at least one fluorine atom, a fluoroalkyl group or a fluoroalkoxy group.

By way of example of monomers, mention may be made of vinyl fluoride;

vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro (alkyl vinyl) ethers such as perfluoro(methyl vinyl) ether (PMVE), perfluoro(ethyl vinyl) ether (PEVE) and perfluoro (propyl vinyl) ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n equals 1, 2, 3, 4 or 5; the product of formula $R_1CH_2OCF=CF_2$ in which $R_1$ is hydrogen or $F(CF_2)_z$ and z equals 1, 2, 3 or 4; the product of formula $R_3OCF=CH_2$ in which $R_3$ is $F(CF_2)_z$- and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer; it may also comprise non-fluorinated monomers such as ethylene.

Advantageously, the fluoropolymer is chosen from:

vinylidene fluoride (VF2) homopolymers and copolymers preferably containing at least 50% by weight of VF2, the comonomer being chosen from chlorotrifluoroethylene (CTFE), hexafluoropropylene (HFP), trifluoroethylene (VF3) and tetrafluoroethylene (TFE);

trifluoroethylene (VF3) homopolymers and copolymers, copolymers, and especially terpolymers, combining the residues of the chlorotrifluoroethylene (CTFE), tetrafluoroethylene (TFE), hexafluoropropylene (HFP) and/or ethylene units and possibly VF2 and/or VF3 units.

Preferably, the fluoropolymer is a polyvinylidene fluoride (PVDF) homopolymer. Advantageously, the PVDF has a viscosity ranging from 100 Pa.s to 2000 Pa.s, the viscosity being measured at 230° C., with a shear rate of 100 s$^{-1}$ using a capillary rheometer. This is because such PVDFs are well suited to extrusion and to injection moulding. Preferably, the PVDF has a is viscosity ranging from 300 Pa.s to 1200 Pa.s, the viscosity being measured at 230° C. with a shear gradient of 100 s$^{-1}$ using a capillary rheometer.

Thus, the PVDFs sold under the brand name KYNARO® 710 or 720 are perfectly suited for this formulation.

This fluoropolymer layer may include additives, fillers, one or more electrically conducting products, impact modifiers of the core/acrylic shell type, a polymer (P1) essentially consisting of alkyl (meth)acrylate units and possibly containing an acrylic impact modifier of the core/shell type, block copolymers and particularly block copolymers of the ABC type. Advantageously, this layer contains at least 50% by weight of fluoropolymer.

By way of example of electrically conducting products, mention may be made of metals and carbon-based products. By way of example of carbon-based products, mention may be made of graphite, carbon black and carbon fibres.

The polymer (P1) essentially consisting of alkyl (meth) acrylate units may also include acid, acid chloride, alcohol and anhydride functional groups. By way of examples of polymer (P1), mention may be made of alkyl (meth)acrylate homopolymers. Alkyl (meth)acrylates are described in KIRK-OTHMER, *Encyclopedia of Chemical Technology*, 4th edition in Vol. 1, pages 292–3 and in Vol. 16, pages 475–478. Mention may also be made of copolymers of at least two of these (meth)acrylates and copolymers of at least one (meth)acrylate with at least one monomer chosen from acrylonitrile, butadiene, styrene and isoprene, provided that the proportion of (meth)acrylate is at least 50 mol %. Advantageously, (P1) is PMMA. These polymers (P1) either consist of the monomers and optionally the comonomers mentioned above and do not contain an impact modifier, or they also contain an acrylic impact modifier. The acrylic impact modifiers are, for example, random or block copolymers of at least one monomer chosen from styrene, butadiene and isoprene and at least one monomer chosen from acrylonitrile and alkyl (meth)acrylates—they may be of the core-shell type. These acrylic impact modifiers may be blended with the polymer (P1) once it has been prepared or may be introduced during the polymerization of (P1), or they may be prepared simultaneously during the polymerization of (P1). The amount of acrylic impact modifier may, for example, be from 0 to 30 parts per 100 to 70 parts of (P1) and advantageously from 5 to 20 parts per 95 to 20 parts of (P1). It would be not be outside the scope of the invention if (P1) were to be a blend of two or more of the above polymers.

With regard to the ABC triblock copolymer, the block copolymer comprising at least three blocks A, B and C is such that the block A is linked to the block B and the block B linked to the block C by means of one or more single covalent bonds. The blocks A, B and C are mutually incompatible and A is compatible with the fluoropolymer.

Advantageously, the block A is chosen from alkyl (alkyl) acrylate homopolymers and copolymers, for example methyl methacrylate (MMA) and/or methyl or ethyl acrylate homopolymers and copolymers and/or those deriving from vinyl acetate. Advantageously, the block A is polymethyl methacrylate (PMMA). Preferably, this PMMA is syndiotactic and its glass transition temperature $T_{g(A)}$, measured by differential thermal analysis, is +120° C. to +140° C.

Advantageously, the $T_g$ of B is less than 0° C. and preferably less than −40° C.

The monomer used to synthesize the elastomeric block B may be a diene chosen from butadiene, isoprene, 2,3-dimethyl-1,3-butadiene, 1,3-pentadiene and 2-phenyl-1,3-butadiene. Advantageously, B is chosen from polydienes, especially polybutadiene, polyisoprene and their random copolymers, or else from partially or completely hydrogenated polydienes. Among polybutadienes, it is advantageous to use those whose $T_g$ is the lowest, for example poly(1,4-butadiene) whose $T_g$ (around −90° C.) is less than that of poly(1,2-butadiene) (around 0° C.). The blocks B may also be hydrogenated. This hydrogenation is carried out using standard techniques.

The monomer used to synthesize the elastomeric block B may also be an alkyl (meth)acrylate; the following $T_g$ values are obtained, given between brackets following the name of the acrylate: ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.). Advantageously, butyl acrylate is used. The acrylates are different from those of block A in order to satisfy the condition that B and A be incompatible.

Preferably, the blocks B consist predominantly of poly(1, 4-butadiene).

Preferably, the block C has a glass transition temperature $T_{g(C)}$ or a melting point $T_{m(C)}$ greater than the $T_{g(B)}$ of the block B. This characteristic gives the possibility of the block C being in the glassy state or in a partially crystalline state and the block B in the elastomeric state, for the same operating temperature $T_p$.

Advantageously, the block C is chosen from styrene or α-methylstyrene homopolymers or copolymers.

The triblocks which contain blocks deriving from an alkyl (alkyl)acrylate may especially be prepared by anionic polymerization, for example as per the processes described in Patent Applications EP 524 054 and EP 749 987.

Preferably, the triblock ABC is poly(methyl methacrylate-b-butadiene-b-styrene).

The ABC triblock copolymer may contain, as by-products of its synthesis, a BC diblock copolymer and possibly the homopolymer C. The ABC triblock copolymer may also contain, as by-products of its synthesis, a AB diblock copolymer and possibly the homopolymer A.

This is because the synthesis of a triblock copolymer is preferably carried out by joining together, in succession, the block A to the block B and then to the block C, or conversely the block C to the block B and then to the block A, depending on the nature of the three block A, B and C, the block A being by definition the one which is compatible with the fluoropolymer. The ABC triblock copolymer may also contain symmetrical linear or star-configured block copolymers of the ABA or CBC type.

Advantageously, the total amount by weight of the synthesis by-products, that is to say these homopolymers A, C, or AB, BC, ABA and CBC block copolymers, is less than twice the amount of the triblock ABC. Preferably, this amount is less than one times and better still 0.5 times the amount of the triblock ABC. More specifically, the by-products are essentially the diblock BC; the amount of BC may be between 25 and 35 parts by weight per 75 to 65 parts of ABC, respectively, and advantageously about 30 parts by 70 parts of ABC.

The number-average molecular mass ($M_n$) of the triblock copolymer, including the synthesis by-products, is greater than or equal to 20 000 g.mol$^{-1}$ and preferably between 50 000 and 200 000 g.mol$^{-1}$.

Advantageously, the ABC triblock copolymer, including by-products, consists of:

20 to 93 and preferably 30 to 70 parts by weight of A blocks;

5 to 68 and preferably 10 to 40 parts by weight of B blocks; and 2 to 65 and preferably 5 to 40 parts by weight of C blocks.

With regard to the tie resin, and firstly the diamine of formula (1), mention may be made, by way of example, of diamines in which $R_1$ and $R_2$ denote H (piperazine) and those in which $R_1$ is H and $R_2$ is —CH$_2$—CH$_2$—NH$_2$.

By way of example of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (such dimerized fatty acids having a dimer content of at least 98% and are preferably hydrogenated) and dodecanedioic acid HOOC—(CH$_2$)$_{10}$—COOH.

The condensation of the diamine of formula (1) with the diacid takes place according to known techniques for synthesizing polyamides. A mixture of diacids and/or a mixture of diamines of formula (1) may be used.

The tie resin may include other units chosen from alpha, omega-aminocarboxylic acids and diamines different form the diamine of formula (1). By way of example of alpha, omega-aminocarboxylic acids, mention may be made of aluinocaproic, 7-aminoheptanoic, 11-aminoundecanoic and 12-aminododecanoic acids. It would not be outside the scope of the invention to replace the alpha, omega-aminocarboxylic acid with the corresponding lactam, if it exists. By way of example of lactams, mention may be made of caprolactam, oenantholactam and lauryllactam. The other diamine may be an aliphatic diamine having from 6 to 12 atoms or it may be an aryl diamine and/or a saturated cyclic diamine. By way of examples, mention may be made of hexamethylenediamine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM), bis(3-methyl-4-aminocyclohexyl)methane (BMACM), PACM, which denotes para-aminodicyclohexylmethane, and met-axylylenediamine (MXD).

Advantageously, the tie resin contains at least 50% by weight of units consisting of residues of the diamine of formula (1) which have condensed with the diacid.

According to another embodiment of the invention, the tie resin is a copolymer having polyamide blocks and polyether blocks, the polyamide blocks resulting from the condensation of at least one diacid and at least one diamine of formula (1). That is to say, the polyamide blocks of the copolymer having polyamide blocks and polyether blocks are the tie resin described in the above paragraph.

Copolymers having polyamide blocks and polyether blocks result from the copolycondensation of polyamide blocks having reactive end groups with polyether blocks having reactive end groups, such as, among others:

1) Polyamide blocks having diamine chain ends with polyoxyalkylene blocks having dicarboxylic chain ends;

2) Polyamide blocks having dicarboxylic chain ends with polyoxyalkylene blocks having diamine chain ends obtained by cyanoethylation and hydrogenation of aliphatic dihydroxylated alpha, omega-polyoxyalkylene blocks called polyether diols;

3) Polyamide blocks having dicarboxylic chain ends with polyether diols, the products obtained being, in this particular case, polyetheresteramides.

The polyamide blocks having carboxylic chain ends are obtained by using a diacid chain stopper, that is to say the condensation of the diamine of formula (1) and the diacid is carried out with an excess of this diacid, or by adding another diacid. The polyamide blocks having diamine chain ends are obtained by using a diamine chain stopper, that is to say the condensation of the diamine of formula (1) and the diacid is carried out with an excess of this diamine or by adding another diamine. The polyamide blocks may include other units chosen from alpha, omega-aminocarboxylic acids and diamines different from the diamine of formula (1). Examples of such monomers have been mentioned above.

Advantageously, the copolymer having polyamide blocks and polyether blocks contains at least 50% by weight of units consisting of the residues of the diamine of formula (1) which have condensed with the diacid.

The polyether blocks may represent from 5 to 85% by weight of the copolymer having polyamide blocks and polyether blocks. The polyether blocks may contain ethylene oxide units, propylene oxide units or polytetrahydrofuran (the latter resulting in polytetramethylene glycol chain segments). It is also possible to use simultaneously two or three types of blocks chosen from PEG blocks, that is to say those consisting of ethylene oxide units, PPG blocks, that is to say those consisting of propylene oxide units, and PTMG blocks, that is to say those consisting of tetramethylene glycol units, these also being called polytetrahydrofuran.

The amount of polyether blocks in the copolymer having polyamide blocks and polyether blocks is advantageously from 10 to 55% and preferably from 20 to 45% by weight of the copolymer having polyamide blocks and polyether blocks.

The copolymers of the present invention are advantageously those described in item 3).

The copolymers of the invention may be prepared by any means allowing the polyamide blocks and the polyether blocks to be linked together. In practice, essentially two processes are used, one being called a two-step process, and the other a one-step process.

The two-step process firstly consists in preparing the polyamide blocks having carboxylic end groups and then, in a second step, in adding the polyether and a catalyst. The reaction for preparing the polyamide having carboxylic end groups usually takes place between 180 and 300° C., preferably 200 to 260° C., the pressure in the reactor stabilizes between 5 and 30 bar and is maintained for approximately 2 hours. The pressure is slowly reduced, by venting the reactor, and then the excess water is distilled off, for example over an hour or two.

Having prepared the polyamide having carboxylic acid end groups, the polyether and a catalyst are then added. The polyether may be added in one or more stages, as may the catalyst. According to one advantageous embodiment, the polyether is firstly added and the reaction between the OH end groups of the polyether and the COOH end groups of the polyamide starts with the formation of ester linkages and the elimination of water; the water of the reaction mixture is eliminated as far as possible by distillation and then the catalyst is introduced in order to complete the linking of the polyamide blocks to the polyether blocks. This second step is carried out with stirring, preferably under a vacuum of at least 5 mmHg (650 Pa) at a temperature such that the reactants and the copolymers obtained are in the melt. By way of example, this temperature may be between 100 and 400° C. and usually between 200 and 300° C. The reaction is monitored by measuring the torque exerted by the molten polymer on the stirrer or by measuring the electric power consumed by the stirrer. The end of the reaction is determined by the value of the torque or the target power. The catalyst is defined as being any product allowing the polyamide blocks to be linked to the polyether blocks by esterification. The catalyst is advantageously a derivative of a metal (M) chosen from the group formed by titanium, zirconium and hafnium.

By way of example of a derivative, mention may be made of tetraalkoxides which satisfy the general formula $M(OR)_4$, in which M represents titanium, zirconium or hafnium and the Rs, which are identical or different, denote linear or branched alkyl radicals having from 1 to 24 carbon atoms.

The $C_1$ to $C_{24}$ alkyl radicals from among which the radicals R of the tetraalkoxides used as catalysts in the process according to the invention are chosen are, for example, such as methyl, ethyl, propyl, isopropyl, butyl, ethylhexyl, decyl, dodecyl and hexadodecyl. The preferred catalysts are the tetraalkoxides for which the radicals R, which are identical or different, are $C_1$ to $C_8$ alkyl radicals. Examples of such catalysts are, in particular, $Zr(OC_2H_5)_4$, $Zr(O\text{-}isoC_3H_7)_4$, $Zr(OC_4H_9)_4$, $Zr(OC_5H_{11})_4$, $Zr(OC_6H_{13})_4$, $Hf(OC_2H_5)_4$, $Hf(OC_4H_9)_4$ and $Hf(O\text{-}isoC_3H_7)_4$.

The catalyst used in this process according to the invention may consist only of one or more of the tetraalkoxides of formula $M(OR)_4$ defined above. It may also be formed by the combination of one or more of these tetraalkoxides with one or more alkali or alkaline-earth metal alkoxides of formula $(R_1O)_pY$ in which $R_1$ denotes a hydrocarbon residue, advantageously a $C_1$ to $C_{24}$, and preferably $C_1$ to $C_8$, alkyl residue, Y represents an alkali or alkaline-earth metal and p is the valency of Y. The amounts of alkali or alkaline-earth metal alkoxide and of zirconium or hafnium tetraalkoxides which are combined in order to form the mixed catalyst may vary over wide limits. However, it is preferred to use amounts of alkoxide and of tetraalkoxides such that the molar proportion of alkoxide is approximately equal to the molar proportion of tetraalkoxide.

The proportion of catalyst by weight, that is to say of the tetraalkoxide or tetraalkoxides when the catalyst does not contain an alkali or alkaline-earth metal alkoxide, or else of the combination of the tetraalkoxide or tetraalkoxides and the alkali or alkaline-earth metal alkoxide or alkoxides, when the catalyst is formed by the combination of these two types of compounds, advantageously varies from 0.01 to 5% of the weight of the mixture of the dicarboxylic polyamide with the polyoxyalkylene glycol and preferably lies between 0.05 and 2% of this weight.

By way of example of other derivatives, mention may also be made of salts of the metal (M), particularly the salts of (M) and of an organic acid and the complex salts between the oxide of (M) and/or the hydroxide of (M) and an organic acid. Advantageously, the organic acid may be formic acid, acetic acid, propionic acid, butyric acid, valeric acid, caproic acid, caprylic acid, lauric acid, myristic acid, palmitic acid, stearic acid, oleic acid, linolic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. Advantageously, M is zirconium. These salts may be called zirconyl salts. The Applicant believes, without being tied to this explanation, that these salts of zirconium and of an organic acid or the complex salts mentioned above release $ZrO^{++}$ during the process. The product sold under the name zirconyl acetate is used. The amount to be used is the same as for the $M(OR)_4$ derivatives.

This process and these catalysts are described in Patents U.S. Pat. Nos. 4,332,920, 4,230,838, 4,331,786, 4,252,920, JP 07145368A, JP 06287547A and EP 613919.

With regard to the one-step process, all the reactants used in the two-step process, i.e. the polyamide precursors, the polyether and the catalyst are mixed. These are the same reactants and the same catalyst as in the two-step process described above.

The copolymer has essentially the same polyether blocks and the same polyamide blocks, but also a small portion of the various reactants that have reacted in a random fashion and are distributed randomly along the polymer chain.

The reactor is closed and heated, with stirring, as in the first step of the two-step process described above. The pressure stabilizes between 5 and 30 bar. When it no longer changes, the reactor is put under a reduced pressure, while maintaining vigorous stirring of the molten reactants. The reaction is monitored as before, in the case of the two-step process.

The catalyst used in the one-step process is preferably a salt of the metal (M) and of an organic acid, or a complex salt between the oxide of (M) and/or the hydroxide of (M) and an organic acid.

With regard to the substrate, by way of example mention may be made of:

chlorinated polymers: PVC, plasticized PVC, chlorinated PE;

polymers and copolymers containing styrene, such as ABS, SAN and PS;

saturated polyesters (PET, PBT, etc.) and copolyesters or blends, unsaturated polyester resins (SMC);

epoxy and phenolic resins;

ethylene/alkyl acrylate or ethylene/acetate copolymers (EMA, EVA) which may or may not be functionalized;

PAs (polyamides) and CoPAs (copolyamides), PEBA, polyesteramides and TPUs (thermoplastic polyurethanes);

EVOH (ethylene/vinyl alcohol copolymer);

aluminium, steel or mixtures of metals;

lignin-based composites;

acrylic compounds (PMMA, etc.);

glass;

polyethylene, particularly high-density polyethylene; and

PVC and PU foams.

EXAMPLES

The following products were used:

Tie resin A: a copolyamide resulting from the condensation of piperazine, azelaic acid, dodecanedioic acid, lauryllactam and aminoundecanoic acid. The MFI (Melt Flow Index) was 5 g/10 min (150° C./2.16 kg);

Tie resin B (not according to the invention): a copolyamide resulting from the condensation of adipic acid, hexamethylenediamine, caprolactam and lauryllactam. The MFI (Melt Flow Index) was 7 g/10 min (150° C./2.16 kg);

Kynar® 720: a PVDF homopolymer having a MVI (Melt Volume Index) of 10 cm$^3$/10 min (230° C./5 kg);

Kynaro® 710: a PVDF homopolymer having a MVI (Melt Volume Index) of 20 cm$^3$/10 min (230° C./5 kg).

Preparation of Tie Resin A:

Preparation of the copolymer Pip.9/Pip.12/11 in proportions of 15/70/15. The following monomers were introduced into an autoclave fitted with a stirrer: 3565 g of piperazine, 1669 g of azelaic ($C_9$) acid, 7642 g of dodecanedioic ($C_{12}$) acid, 2250 g of aminoundecanoic acid and 50 g of $H_2O$.

The mixture thus formed was put under an inert atmosphere and heated until the temperature reached 260° C., continuing to stir vigorously as soon as the reactants melted. The temperature of 260° C. and pressure of 25 bar were maintained for two hours (precondensation). Next, the pressure was slowly reduced (over 1 h) from 25 bar to atmospheric pressure, keeping the temperature at 260° C. The polycondensation of the reaction mixture was continued for one hour with a constant stream of nitrogen (nitrogen flush). Next, the reaction mixture was subjected to an absolute pressure of 30 mbar for about half an hour, again at T=260° C. The product was extruded into a water bath and granulated. The product obtained had a relative solution viscosity (0.5 g/100 ml of m-cresol; T=25° C.; DIN 53727) of 1.56, an MVR (150° C./2.16 kg; ISO 1133) in the dry state of 5.1 cm$^3$/10 min and a melting point (determined optically according to DIN 53736 B) of 120–130° C.

Preparation of Tie Resin B:

The same procedure as for tie resin A was used.

Production of Tie Resin A/Kynar Two-layer Films

Tie resin A/Kynar 720 (20 µm/30 µm) two-layer films were obtained using a process for blowing a bubble on a line of the Kiefelo® brand (225 mm die diameter and using a blow ratio resulting in a width of 700 mm). The extruders for the Kynar 720 and the tie resin A had diameters of 50 and 60 mm and lengths equal to 25D and 29D (D denotes the diameter of the screw or screws of the extruder), respectively. These two extruders had a polyethylene-type profile. The extrusion temperature for the tie resin was between 140 and 180° C. while that of the PVDF was between 210 and 250° C. After this operation, the films were pressed onto various substrates. A peel test (200 mm/min; 90° angle) was carried out on the final structure. The table below gives the results.

| Substrate | Adhesion |
| --- | --- |
| Fasal F197 ® wood | 14 N/15 mm, localized initiation at the wood/tie resin A interface. Pressing of the film at 160° C. |
| Cleaned Steel | Initiation at the tie resin/Kynar 720 interface, but instant failure of the Kynar 720. Pressing at 160° C. |
| SMC (unsaturated polyester) Norsodyne ® (Cray Valley ®) | Initiation, but instant failure. |
| Pressing the film [tie resin A/Kynar 720] on itself. This structure becomes [Kynar 720/tie resin A/tie resin A/Kynar 720] | No initiation possible at 160° C. |

By way of comparison, a tie resin B/Kynar (720 or 710) two-layer structure exhibited no adhesion.

Sheet Coextrusion:

PVC/tie resin A/Kynar 720 or Kynar 710 (1.9 mm/90 µm/140 µm) three-layer structures were produced on a three-layer calendering coextrusion line of the AMUT® brand through a multichannel (three-channel) die of the Verbruggen® brand. The PVC used was a Nakan® PEY001E. The Kynar layer was extruded in an extruder having a diameter of 45 mm and a length of 28D, at a temperature between 220 and 250° C. The extruder used for the layer of tie resin A had a diameter of 45 mm and a length of 26D. The temperature was set between 120 and 150° C. The PVC was extruded in a counter-rotating conical twin-screw extruder having a diameter of 60 mm at a temperature of between 170 and 195° C.

Initiation was possible at both interfaces, but there was no propagation.

What is claimed is:

1. A structure comprising a fluoropolymer layer and directly attached to one of its sides a tie layer comprising a tie resin comprising a polyamide which results from the condensation of monomers comprising essentially at least one diacid and at least one diamine of the following formula (1):

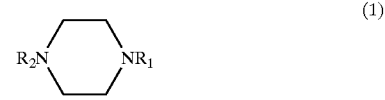

in which:

R$_1$ represents H or -Z1-NH$_2$ and Z1 represents an alkyl, a cycloalkyl or an aryl having up to 15 carbon atoms and R$_2$ represents H or -Z2-NH$_2$ and Z2 represents an alkyl, a cycloalkyl or an aryl having up to 15 carbon atoms, it being possible for R$_1$ and R$_2$ to be identical or different.

2. A structure according to claim 1, the tie resin further comprising units selected from the group consisting of alpha, omega-aminocarboxylic acids and diamines different from the diamine of formula (1).

3. A structure according to claim 1, in which the tie resin is a copolymer having polyamide blocks and polyether blocks, the polyamide blocks resulting from condensation of at least one diacid and at least one diamine of formula (1).

4. A structure according to claim 3, in which the polyamide blocks of the tie resin include other units selected from the group consisting of alpha, omega-aminocarboxylic acids and diamines different from the diamine of formula (1).

5. A structure according to claim 1, further comprising on the tie-resin side, a substrate layer.

6. A structure according to claim 1, further comprising on the fluoropolymer side, another tie layer.

7. A structure according to claim 1, wherein fluoropolymer is a polyvinyl difluoride homopolymer or copolymer.

8. A structure according to claim 1, said fluoropolymer layer comprising at least one additive selected from the group consisting of a non-conducting filler, an electrically conducting filler, a core/acrylic-shell impact modifier, polymers (P1) essentially consisting of alkyl (meth)acrylate units optionally containing a core/shell acrylic impact modifier, and block copolymers.

9. A structure according to claim 8, wherein the fluoropolymer layer comprises a core/acrylic-shell impact modifier, polymers (P1) essentially consisting of alkyl (meth)acrylate units optionally containing a core/shell acrylic impact modifier, or block copolymers.

10. A structure according to claim 9, wherein the fluoropolymer layer comprises an ABC triblock copolymer.

11. A structure according to claim 2, wherein fluoropolymer is a polyvinyl difluoride homopolymer or copolymer.

12. A structure according to claim 3, wherein fluoropolymer is a polyvinyl difluoride homopolymer or copolymer.

13. A structure according to claim 1, wherein the polyamide is a copolymer resulting from the condensation of piperazine, azelaic acid, dodecanedioic acid and lauryllactam.

14. A structure according to claim 7, wherein the polyamide is a copolymer resulting from the condensation of piperazine, azelaic acid, dodecandioic acid and lauryllactam.

15. A structure according to claim 1, wherein the tie resin comprises at 50% by weight of units consisting of residues of the diamine of formula (1) which have condensed with the diacid.

16. A structure according to claim 1, wherein the tie resin comprises a polymer having polyamide blocks and polyether blocks.

17. A structure according to claim 1, wherein which $R_1$ and $R_2$ are each H, or $R_1$ is H and $R_2$ is $—CH_2—CH_2—NH_2$.

18. A structure according to claim 1, further comprising another tie layer comprising a tie resin comprising a polyamide resulting from the condensation of monomers comprising essentially at least one diacid and at least one diamine of the following formula (1), wherein said another tie layer is directly attached to the other side of said fluoropolymer layer.

19. A structure according to claim 1, wherein the fluoropolymer is a vinylidene fluoride homopolymer; a vinylidene fluoride copolymer containing at least 50% by weight of vinylidene fluoride wherein the comonomers are selected from chlorotrifluoroethylene, hexafluoropropylene, trifluoroethylene and tetrafluoroethylene; a trifluoroethylene homopolymer; a trifluoroethylene copolymer; a copolymer containing residues of chlorotrifluoroethylene, tetrafluoroethylene, hexafluoropropylene and ethylene.

20. A structure according to claim 1, wherein the fluoropolymer is a polyvinylidene fluoride homopolymer having a viscosity, measured at 230° C., of within the range of from 100 Pas to 2000 Pa.s.

21. A structure according to claim 2, wherein the tie resin comprises at 50% by weight of units consisting of residues of the diamine of formula (1) which have condensed with the diacid.

22. A structure according to claim 3, wherein the tie resin comprises at 50% by weight of units consisting of residues of the diamine of formula (1) which have condensed with the diacid.

23. A structure according to claim 3, wherein polyether blocks represent from 5 to 85% by weight of the copolymer having polyamide blocks and polyether blocks.

24. A structure according to claim 3, wherein polyether blocks represent from 10 to 55% by weight of the copolymer having polyamide blocks and polyether blocks.

25. A structure according to claim 3, wherein polyether blocks represent from 20 to 45% by weight of the copolymer having polyamide blocks and polyether blocks.

26. A structure according to claim 5, wherein said substrate is metal, wood or glass.

27. A structure according to claim 5, wherein said substrate is polymeric.

28. A structure according to claim 27, wherein said substrate is selected from chlorinated polymers, polymers and copolymers containing styrene, saturated polyesters and copolyesters or blends, unsaturated polyester resins, epoxy and phenolic resins, ethylene/alkyl acrylate or ethylene/acetate copolymers which are optionally functionalized, polyamides copolyamides, PEBA, polyesteramides, thermoplastic polyurethanes, ethylene/vinyl alcohol copolymers, acrylic compounds, polyethylene, PVC foams and PU foams.

29. A structure according to claim 27, wherein said substrate is selected from PVC, plasticized PVC, chlorinated PE, ABS, SAN, PS, PET, PBT, SMC, EMA, EVA, EVOH and PMMA.

30. A method of adhering a fluoropolymer layer to a substrate comprising applying a structure according to claim 1 to said substrate whereby said tie resin layer directly contacts said substrate.

31. A method according to claim 30, wherein structure is prepared by coextrusion.

32. A method according to claim 31, wherein said substrate is coextruded with said fluoropolymer layer and said tie resin layer.

33. A method of preparing a multi-layer structure comprising a structure according to claim 1 and a substrate, said method comprising coextruding the tie layer and the substrate layer or laminating the tie layer to the substrate and then, simultaneously or subsequently, hot-bonding the two-layer substrate/tie resin layer structure on the tie-resin layer side to the fluoropolymer.

34. A method of adhering a fluoropolymer layer to two substrates comprising applying first and second substrates to a structure according to claim 18 to whereby each substrate directly contacts one of the tie resin layers.

35. A method according to claim 34, wherein structure is prepared by coextruding or laminating a tie resin layer to each side of the fluoropolymer layer.

36. A method according to claim 34, wherein structure is prepared by coextruding the fluoropolymer layer and a tie resin layer and then laminating another tie layer to the two-layer fluoropolymer/tie resin layer structure on the fluoropolymer side.

* * * * *